US011892145B1

(12) United States Patent
Liang

(10) Patent No.: US 11,892,145 B1
(45) Date of Patent: Feb. 6, 2024

(54) PLASTIC LIGHT BULB

(71) Applicant: Nanning Wang Choi Lighting Technology Co., Ltd., Nanning (CN)

(72) Inventor: Faquan Liang, Nanning (CN)

(73) Assignee: Nanning Wang Choi Lighting Technology Co., Ltd., Nanning (CN)

( * ) Notice: Subject to any disclaimer, the term of this patent is extended or adjusted under 35 U.S.C. 154(b) by 0 days.

(21) Appl. No.: 18/193,892

(22) Filed: Mar. 31, 2023

(30) Foreign Application Priority Data

Feb. 22, 2023 (CN) ........................ 202320289479.X

(51) Int. Cl.
*F21V 19/00* (2006.01)
*F21V 23/06* (2006.01)
*F21K 9/238* (2016.01)
*F21V 23/02* (2006.01)
*F21V 3/06* (2018.01)

(52) U.S. Cl.
CPC .......... *F21V 19/0055* (2013.01); *F21K 9/238* (2016.08); *F21V 3/062* (2018.02); *F21V 19/0045* (2013.01); *F21V 23/02* (2013.01); *F21V 23/06* (2013.01)

(58) Field of Classification Search
CPC ........ F21V 23/06; F21V 23/02; F21V 19/005; F21V 19/0045; F21V 3/062; F21K 9/238
See application file for complete search history.

(56) References Cited

U.S. PATENT DOCUMENTS

2017/0108203 A1* 4/2017 Habchi ................. F21V 29/777
2022/0136660 A1* 5/2022 Huang .................... F21K 9/232
362/363

FOREIGN PATENT DOCUMENTS

CN 113483280 A * 10/2021 ................ F21S 4/10

* cited by examiner

*Primary Examiner* — Anabel Ton
(74) *Attorney, Agent, or Firm* — Westbridge IP LLC

(57) ABSTRACT

Disclosed is a plastic light bulb, comprising a light chip, a socket, a housing, a base and a PC bulb housing. The socket comprises a mounting part and a plug-in part, an external diameter of the plug-in part is smaller than that of the mounting part, and the light chip is installed on the mounting part; the PC bulb housing comprises a housing body and a plug, the housing body is provided with an internal space, and the plug is provided with a through hole; the mounting part is installed in the through hole, and the light chip is positioned in the internal space; and the housing is sleeved on the plug, the base is sleeved on the plug-in part, a negative electrode of the light chip is electrically connected with the housing, and a positive electrode of the light chip is electrically connected with a contact of the base.

8 Claims, 4 Drawing Sheets

PLASTIC LIGHT BULB

CROSS-REFERENCE TO RELATED APPLICATIONS

This application claims priority to Chinese Patent Application No. 202320289479.X, filed on Feb. 22, 2023, the content of which is incorporated herein by reference in its entirety.

TECHNICAL FIELD

The present application belongs to the technical field of light bulbs, in particular to a plastic light bulb.

BACKGROUND

Incandescent lamps have been gradually eliminated by society because they are not environmentally friendly and often provide relatively low color rendering index. As an environmentally friendly material, Light Emitting Diode (LED) can directly convert electric energy into light energy, thus achieving the effect of lighting, and LED has gradually become the mainstream of society.

In the prior art, a plastic light bulb usually needs to be equipped with a bulb socket with the same size as its socket, hence the size of the bulb socket is relatively large, which increase the manufacturing cost of the bulb socket. In addition, although the lamp housing made of Polycarbonate (PC) is also used in the prior art, in order to ensure the blow molding of the lamp housing, the inlet of the lamp housing needs to be made relatively large, which leads to the need to make the base adapted to the lamp housing relatively large, and further leads to the need to make the bulb socket plugged with the base relatively large.

SUMMARY

The present application provides a plastic light bulb, aiming at the technical problem that the manufacturing cost of the light bulb socket is relatively high because the plastic light bulb needs a light bulb socket with a relatively large size in the prior art.

In view of the above technical problem, the embodiments of the present application provides a plastic light bulb, including a light chip, a socket, a housing, a base and a PC bulb housing; wherein the socket includes a mounting part and a plug-in part connected with the mounting part, an external diameter of the plug-in part is smaller than that of the mounting part, and the light chip is installed on the mounting part;

the PC bulb housing includes a housing body and a plug connected with the housing body, the housing body is provided with an internal space, and the plug is provided with a through hole communicated with the internal space; the mounting part is installed in the through hole, and the light chip is positioned in the internal space; and the housing is sleeved on the plug, the base is sleeved on the plug-in part, a negative electrode of the light chip is electrically connected with the housing, and a positive electrode of the light chip is electrically connected with a contact of the base.

Optionally, the mounting part is provided with an annual plug-in groove, and an end of the plug far away from the housing body is clamped in the annual plug-in groove.

Optionally, the plastic light bulb further includes a conductive bracket, and the light chip is mounted on the mounting part through the conductive bracket.

Optionally, the light chip, the conductive bracket and the socket are integrally formed.

Optionally, the mounting part is provided with a cooling hole communicating with the through hole.

Optionally, an outer wall of the plug is provided with a first external thread, and an inner wall of the housing is provided with a first internal thread, the housing is sleeved on the plug through the first external thread and the first internal thread, and the first external thread and the first internal thread are in threaded connection.

Optionally, an outer wall of the plug-in part is provided with a second external thread, the base is provided with a plug-in hole, an inner wall of the plug-in hole is provided with a second internal thread, and the base is sleeved on the plug-in part through the second external thread and the second internal thread, and the second external thread and the second internal thread are in threaded connection.

Optionally, the plastic light bulb further includes a current limiting resistor installed in the socket, and the current limiting resistor is electrically connected with the light chip.

In the present application, the periphery of the PC bulb housing covers the light chip, and the lamp housing made of plastic is not easily broken and has a long service life. The socket includes a mounting part and a plug-in part connected with the mounting part, the external diameter of the plug-in part is smaller than that of the mounting part, and the light chip is installed on the mounting part, the base is sleeved on the plug-in part, so that the base may be made smaller, and the bulb socket adapted to the base may also be made smaller, thereby reducing the manufacturing cost of the bulb socket. In addition, because the PC bulb housing is made of PC material by blow molding process, in order to ensure the appearance of the PC bulb housing, it is necessary to set a through hole with a relatively large diameter; and the mounting part is installed in the through hole, which can support the light chip with small size in the internal space, thus the socket ensures that the light chip with small size is installed in the internal space with relatively large size, and the plug-in part of the socket has a smaller size, and the base sleeved on the plug-in part is also designed smaller, thus further ensuring the smaller size of the bulb socket adapted to the base. Moreover, the plastic light bulb is simple in structure and convenient to assemble.

BRIEF DESCRIPTION OF THE DRAWINGS

The present application will be further illustrated with the attached drawings and embodiments.

Figure 1:
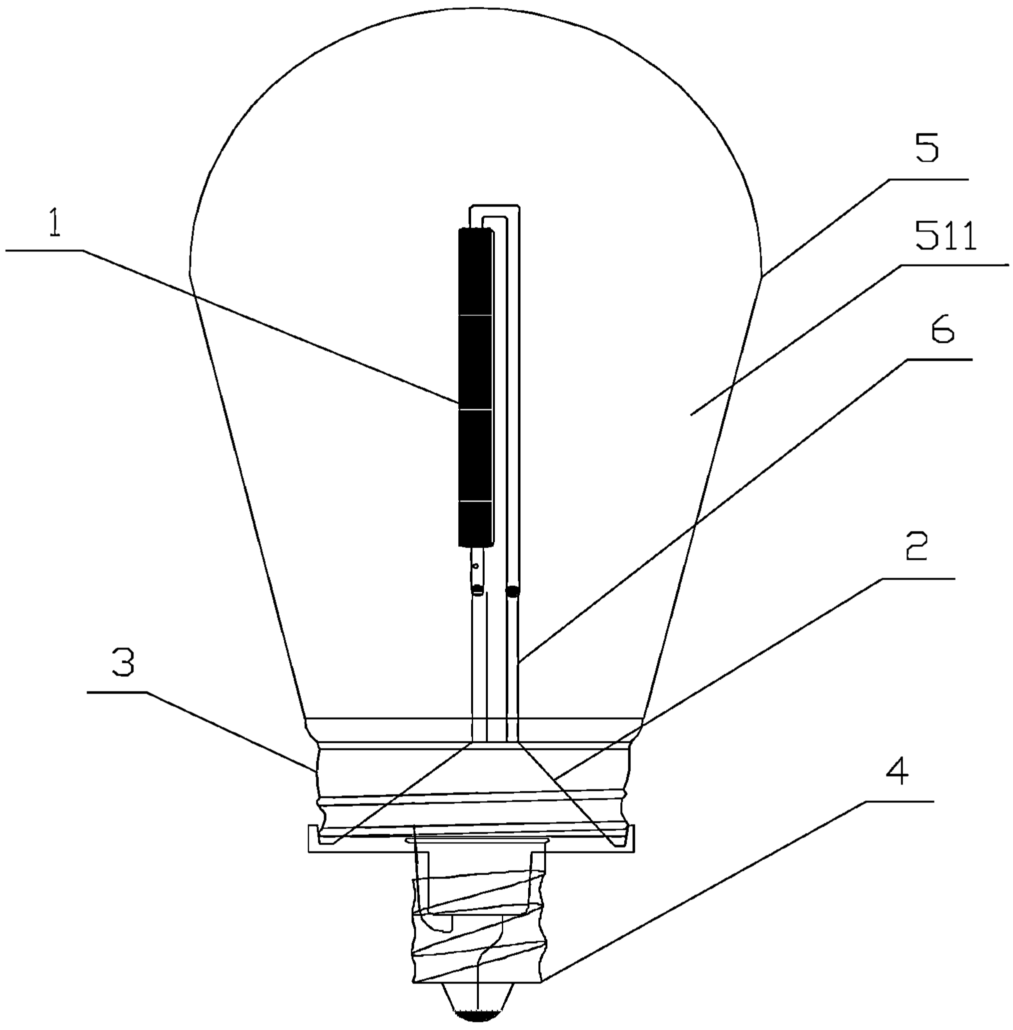
FIG. 1 is a front view of a plastic light bulb provided by an embodiment of the present application.

Reference signs in the drawings are as follows:

1. Light chip; 2. Socket; 21. Mounting part; 211. Annular plug-in groove; 22. Plug-in part; 3. Housing; 4. Base;

5. PC bulb housing; 51. Housing body; 511. Internal space; 52. Plug; 521. Through hole; 6. Conductive bracket.

DETAILED DESCRIPTIONS OF THE EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

It should be understood that the orientation or positional relationship indicated by the terms "upper", "lower", "left", "right", "front", "rear" and "middle" is based on the orientation or positional relationship shown in the attached drawings, only for the convenience of describing the present application and simplifying the description, and does not indicate or imply that the device or element referred to must have a specific orientation, be constructed or operated in a specific orientation. Therefore, it is not intended to limit the scope of the present application.

As shown in FIG. 1 to FIG. 5, the plastic light bulb provided by an embodiment of the present application includes a light chip 1, a socket 2, a housing 3, a base 4 and a PC bulb housing 5; the socket 2 includes a mounting part 21 and a plug-in part 22 connected with the mounting part 21, the external diameter of the plug-in part 22 is smaller than that of the mounting part 21, and the light chip 1 is installed on the mounting part 21. Preferably, the light chip 1 is composed of LED lamp beads. Understandably, the PC bulb housing 5 is made of PC (Polycarbonate) material, and the PC bulb housing 5 made of PC material has high transparency, can withstand high temperature, and has the function of preventing ultraviolet rays. Further, the PC bulb housing 5 is made by a blow molding process.

The PC bulb housing 5 includes a housing body 51 and a plug 52 connected with the housing body 51, the housing body 51 is provided with an internal space 511, and the plug 52 is provided with a through hole 521 communicating with the internal space 511; the mounting part 21 is installed in the through hole 521, and the light chip 1 is positioned in the internal space 511. It can be understood that the housing body 51 and the plug 52 are integrally formed, the housing body 51 is an oval structural member, the plug 52 is a cylindrical structural member, the mounting part 21 is in interference fit with the through hole 521, and the light chip 1 is installed in the internal space 511 after passing through the through hole 521.

The housing 3 is sleeved on the plug 52, the base 4 is sleeved on the plug-in part 22, a negative electrode of the light chip 1 is electrically connected with the housing 3, and the positive electrode of the light chip 1 is electrically connected with a contact of the base 4. Understandably, the housing 3 is made of aluminum, and the negative electrode of the light chip 1 is in contact with the housing 3, so that the housing 3 serves as the negative electrode of the whole plastic light bulb; a positive electrode of the light chip 1 is electrically connected with a contact of the base 4, so that the contact of the base 4 serves as the positive electrode of the whole plastic light bulb.

In the present application, the periphery of the PC bulb housing 5 covers the light chip 1, and the lamp housing made of plastic is not easily broken and has a long service life. The socket 2 includes a mounting part 21 and a plug-in part 22 connected with the mounting part 21, the external diameter of the plug-in part 22 is smaller than that of the mounting part 21, and the light chip 1 is installed on the mounting part 21, the base 4 is sleeved on the plug-in part 22, so that the base 4 may be made smaller, and the bulb socket adapted to the base 4 may also be made smaller, thereby reducing the manufacturing cost of the bulb socket. In addition, because the PC bulb housing 5 is made of PC material by blow molding process, in order to ensure the appearance of the PC bulb housing 5, it is necessary to set a through hole 521 with a relatively large diameter; and the mounting part 21 is installed in the through hole 521, which can support the light chip 1 with small size in the internal space 511, thus the socket 2 ensures that the light chip 1 with small size is installed in the internal space 511 with relatively large size, and the plug-in part 22 of the socket 2 has a smaller size, and the base 4 sleeved on the plug-in part 22 is also designed smaller, thus further ensuring the smaller size of the bulb socket adapted to the base 4. Moreover, the plastic light bulb is simple in structure and convenient to assemble.

Figure 2:
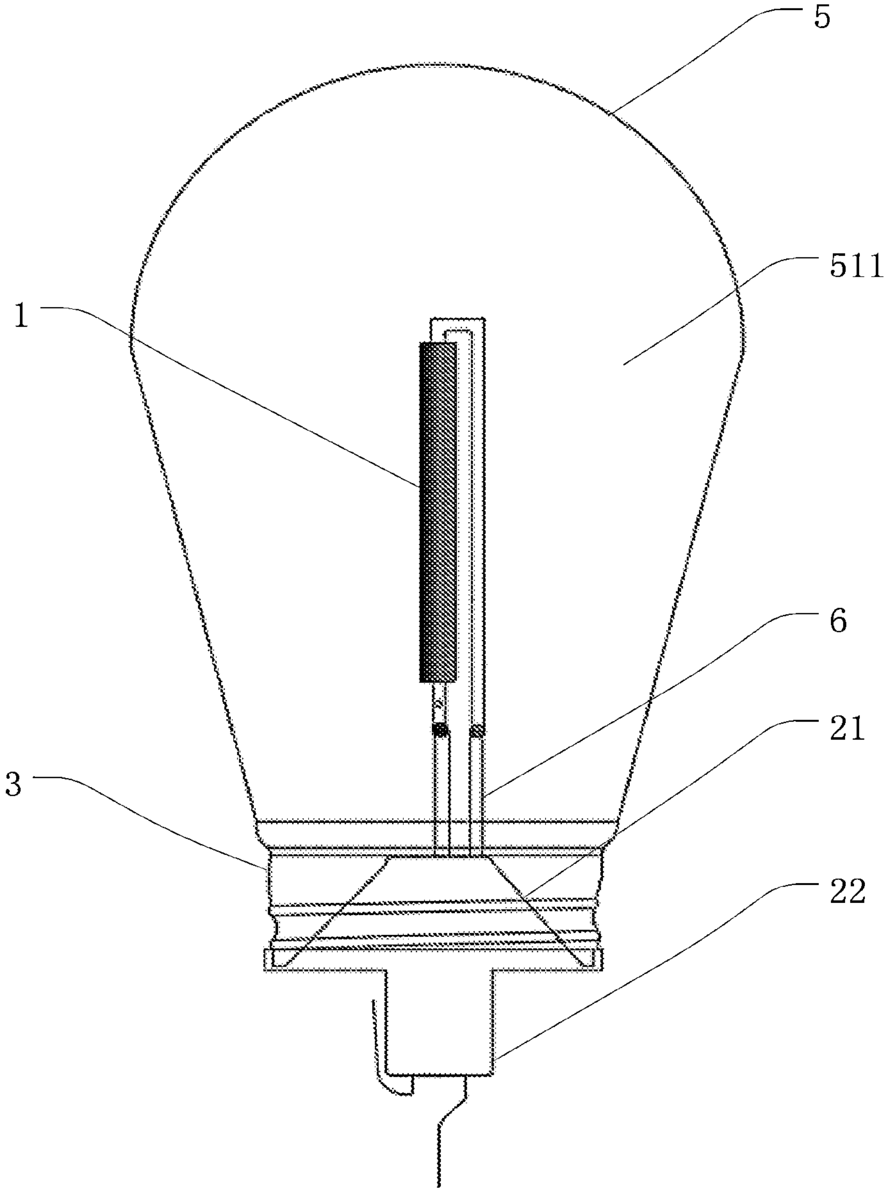
FIG. 2 is a partial front view of a plastic light bulb provided by an embodiment of the present application.
Figure 3:
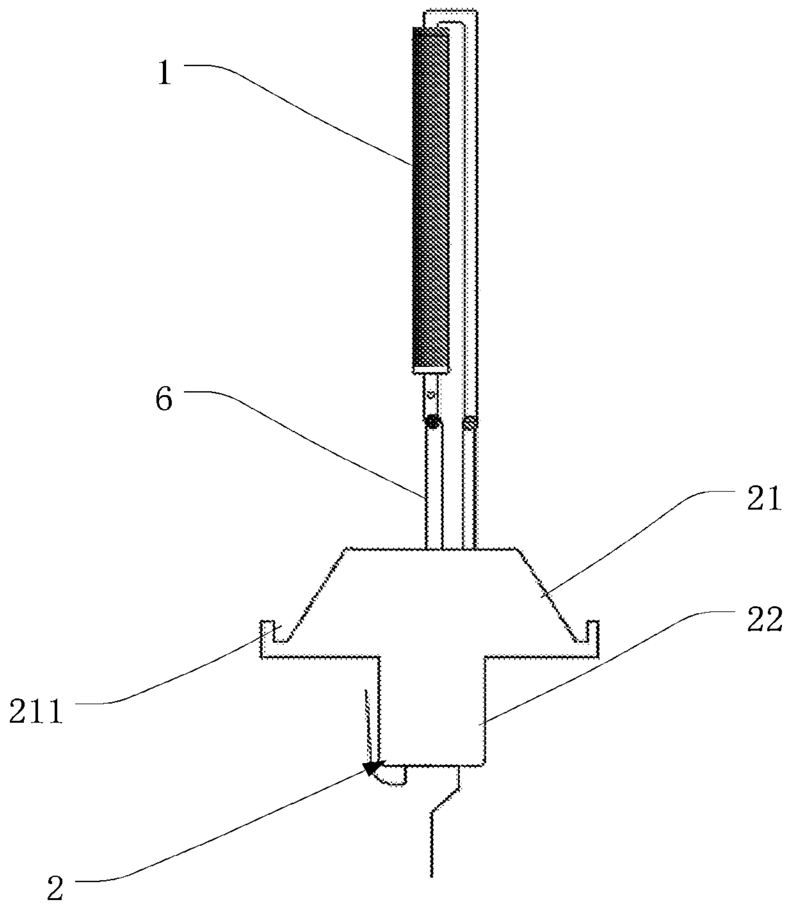
FIG. 3 is a front view of a light chip installed on a socket through a conductive bracket.
Figure 4:
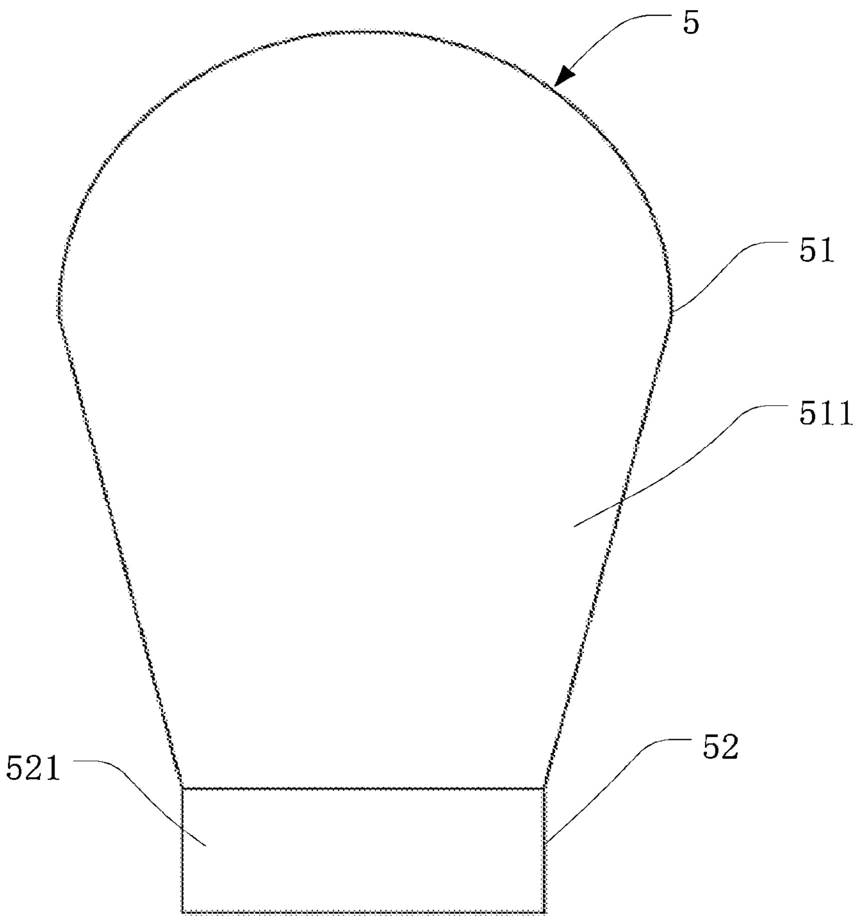
FIG. 4 is a front view of a PC bulb housing of a plastic light bulb provided by an embodiment of the present application.
Figure 5:
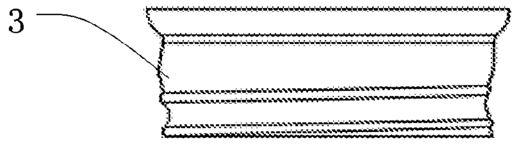
FIG. 5 is a front view of a housing of a plastic light bulb provided by an embodiment of the present application.

In an embodiment, as shown in FIGS. 2 and 3, the mounting part 21 is provided with an annual plug-in groove 211, and an end of the plug 52 far from the housing body 51 is clamped in the annual plug-in groove 211. Understandably, the annual plug-in groove 211 is arranged at the lower part of the plug 52, and when the mounting part 21 is interference-fitted in the through hole 521, the annual plug-in groove 211 engages with the edge of the plug 52, thus ensuring the stability of the socket 2 installed in the PC bulb housing 5. Further, the plug 52 can be firmly installed in the annular plug-in groove 211 through a dotting locking process.

In an embodiment, as shown in FIG. 3, the plastic light bulb further includes a conductive bracket 6, and the light chip 1 is mounted on the mounting part 21 through the conductive bracket 6. Understandably, the conductive bracket 6 extends upward, so that the light chip 1 can be located in the middle of the internal space 511, which ensures the illumination of the plastic light bulb.

In an embodiment, as shown in FIG. 3, the light chip 1, the conductive bracket 6 and the socket 2 are integrally formed structure. Understandably, the light chip 1, the conductive bracket 6 and the socket 2 are made into one integrated piece, which further improves the convenience of assembling the plastic light bulb.

In an embodiment, the mounting part 21 is provided with a cooling hole (not shown) communicating with the through hole 521. Understandably, because the light chip 1 emits relatively heavy heat in the working process, the design of the cooling hole would enhance the heat dissipation capacity of the plastic light bulb and prolongs the service life of the plastic light bulb.

In an embodiment, as shown in FIG. 1, an outer wall of the plug 52 is provided with a first external thread (not shown in the figure), and an inner wall of the housing 3 is provided with a first internal thread (not shown in the figure), and the housing 3 is sleeved on the plug 52 through the first external thread and the first internal thread which are in threaded connection. Understandably, the housing 3 is sleeved on the outer wall of the plug 52 through a threaded structure, and the assembly and disassembly between the housing 3 and the plug 52 is simple.

In an embodiment, as shown in FIG. 1, an outer wall of the plug-in part 22 is provided with a second external thread (not shown in the figure), the base 4 is provided with a plug-in hole, and an inner wall of the plug-in hole is provided with a second internal thread (not shown in the figure), and the base 4 is sleeved on the plug-in part 22 through the second external thread and the second internal thread which are in threaded connection. Understandably, the base 4 is sleeved on the plug-in part 22 through a threaded joint, so that the disassembly and assembly between the base 4 and the plug-in part 22 is simple.

In an embodiment, the plastic light bulb further includes a current limiting resistor (not shown in the figure) installed in the socket 2, and the current limiting resistor is electrically connected with the light chip 1. Understandably, the current limiting resistor can limit the current entering the light chip 1, thereby avoiding the accident that the light chip 1 is burnt out due to excessive current.

The above descriptions are only preferred embodiments of the small outdoor power bank of the present application, and are not intended to limit the present application. Any modifications, equivalent substitutions and improvements made within the spirit and principle of the present application shall be included in the protection scope of the present application.

What is claimed is:

1. A plastic light bulb, comprising a light chip, a socket, a housing, a base and a PC bulb housing; wherein the socket comprises a mounting part and a plug-in part connected with the mounting part, an external diameter of the plug-in part is smaller than that of the mounting part, and the light chip is installed on the mounting part;

the PC bulb housing comprises a housing body and a plug connected with the housing body, the housing body is provided with an internal space, and the plug is provided with a through hole communicated with the internal space; the mounting part is installed in the through hole, and the light chip is positioned in the internal space; and the housing is sleeved on the plug, the base is sleeved on the plug-in part, a negative electrode of the light chip is electrically connected with the housing, and a positive electrode of the light chip is electrically connected with a contact of the base.

2. The plastic light bulb of claim 1, wherein the mounting part is provided with an annular plug-in groove, and an end of the plug far away from the housing body is clamped in the annular plug-in groove.

3. The plastic light bulb of claim 1, wherein the plastic light bulb further comprises a conductive bracket, and the light chip is mounted on the mounting part through the conductive bracket.

4. The plastic light bulb of claim 3, wherein the light chip, the conductive bracket and the socket are integrally formed.

5. The plastic light bulb of claim 1, wherein the mounting part is provided with a cooling hole communicating with the through hole.

6. The plastic light bulb of claim 1, wherein an outer wall of the plug is provided with a first external thread, and an inner wall of the housing is provided with a first internal thread, the housing is sleeved on the plug through the first external thread and the first internal thread, and the first external thread and the first internal thread are in threaded connection.

7. The plastic light bulb of claim 1, wherein an outer wall of the plug-in part is provided with a second external thread, the base is provided with a plug-in hole, an inner wall of the plug-in hole is provided with a second internal thread, and the base is sleeved on the plug-in part through the second external thread and the second internal thread, and the second external thread and the second internal thread are in threaded connection.

8. The plastic light bulb of claim 1, wherein the plastic light bulb further comprises a current limiting resistor installed in the socket, and the current limiting resistor is electrically connected with the light chip.

* * * * *